(12) United States Patent
Zhang et al.

(10) Patent No.: US 11,189,044 B2
(45) Date of Patent: Nov. 30, 2021

(54) METHOD AND DEVICE FOR DETECTING OBJECT STACKING STATE AND INTELLIGENT SHELF

(71) Applicant: BOE TECHNOLOGY GROUP CO., LTD., Beijing (CN)

(72) Inventors: Ying Zhang, Beijing (CN); Yifei Zhang, Beijing (CN); Kai Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 96 days.

(21) Appl. No.: 16/455,409

(22) Filed: Jun. 27, 2019

(65) Prior Publication Data
US 2020/0043192 A1 Feb. 6, 2020

(30) Foreign Application Priority Data
Aug. 1, 2018 (CN) .......................... 201810862510.8

(51) Int. Cl.
*G06T 7/60* (2017.01)
*G06K 9/46* (2006.01)
*A47F 5/00* (2006.01)
*A47F 7/00* (2006.01)
*G06Q 10/08* (2012.01)

(52) U.S. Cl.
CPC .............. *G06T 7/60* (2013.01); *G06K 9/4609* (2013.01); *A47F 5/0043* (2013.01); *A47F 7/0007* (2013.01); *G06Q 10/087* (2013.01); *G06T 2207/10024* (2013.01); *G06T 2207/10028* (2013.01)

(58) Field of Classification Search
None
See application file for complete search history.

(56) References Cited

U.S. PATENT DOCUMENTS

| 2008/0077511 | A1* | 3/2008 | Zimmerman | .......... G06Q 10/00 705/28 |
| 2016/0140397 | A1* | 5/2016 | Zhang | ................ G06K 9/00369 382/103 |
| 2018/0005176 | A1 | 1/2018 | Williams et al. | |

FOREIGN PATENT DOCUMENTS

| CN | 102982332 A | 3/2013 |
| CN | 105021375 A | 11/2015 |

(Continued)

OTHER PUBLICATIONS

Chinese Office Action corresponding to CN 201810862510.8; dated Jul. 5, 2021 (18 pages, including English translation).

*Primary Examiner* — Matthew C Bella
*Assistant Examiner* — Brian D Shin
(74) *Attorney, Agent, or Firm* — Myers Bigel, P.A.

(57) ABSTRACT

A method and a device for detecting an object stacking state, and an intelligent shelf are disclosed. The method comprises capturing a color image and a depth image that are aligned with each other above a reference plane in which the object is located, identifying the object and an area occupied by the object in the color image, converting the depth image into a height map relative to the reference plane, determining a reference height of the object based on the height map and the area occupied by the object, acquiring an actual height of the object based on the identified object, and comparing the reference height of the object with the actual height of the object and judging a stacking state of the object based on a result of the comparing.

14 Claims, 6 Drawing Sheets

(56) References Cited

FOREIGN PATENT DOCUMENTS

| CN | 105607635 A | 5/2016 |
| CN | 107045641 A | 8/2017 |
| CN | 107224155 A | 10/2017 |
| CN | 107742318 A | 2/2018 |

* cited by examiner

METHOD AND DEVICE FOR DETECTING OBJECT STACKING STATE AND INTELLIGENT SHELF

RELATED APPLICATION

The present application claims the benefit of Chinese Patent Application No. 201810862510.8, filed on Aug. 1, 2018, the entire disclosures of which are incorporated herein by reference.

TECHNICAL FIELD

The present disclosure relates to identification technologies, and particularly relates to a method and a device for detecting an object stacking state, and an intelligent shelf.

BACKGROUND

Currently, the radio frequency identification (RFID) or image recognition is commonly employed in related art for object or item identification in the fields of intelligent retail and warehousing. In RFID, although the technical threshold is not high, it is easy to misjudge due to environmental influences, and each item needs an individual RFID, so the cost is high. On the other hand, in the image recognition based solution, a camera is relatively stable, and items or goods are mainly identified by the image recognition technology, so that the number of goods or items can be counted, for example. However, image recognition cannot overcome the occlusion problem, and thus it is impossible to accurately identify the stacking state of items, which makes it difficult to guarantee the validity of the quantity statistics.

SUMMARY

The present disclosure provides a technical solution capable of effectively solving the problems in the related art.

According to a first aspect of the present disclosure, a method for detecting an object stacking state is provided, comprising:

capturing a color image and a depth image that are aligned with each other above a reference plane in which the object is located;

identifying the object and an area occupied by the object in the color image;

converting the depth image into a height map relative to the reference plane;

determining a reference height of the object based on the height map and the area occupied by the object;

acquiring an actual height of the object based on the identified object; and comparing the reference height of the object with the actual height of the object and judging a stacking state of the object based on a result of the comparing.

In the method for detecting an object stacking state according to some embodiments of the present disclosure, the capturing the color image and the depth image that are aligned with each other above the reference plane in which the object is located comprises at least one of: capturing the depth image by a passive ranging; and capturing the depth image by an active ranging.

In the method for detecting an object stacking state according to some embodiments of the present disclosure, the capturing the depth image by the passive ranging comprises: capturing the depth image by a binocular distance measurement.

In the method for detecting an object stacking state according to some embodiments of the present disclosure, the converting the depth image into the height map relative to the reference plane comprises: acquiring depth information and a viewing angle of each of pixels in the depth image; calculating a height of each of the pixels in the depth image relative to the reference plane based on the depth information and the viewing angle; and converting the depth image into the height map based on the calculated height of each of the pixels in the depth image relative to the reference plane.

In the method for detecting an object stacking state according to some embodiments of the present disclosure, the converting the depth image into the height map relative to the reference plane comprises: acquiring depth information and a viewing angle of each of pixels in the depth image and at least two marker points on the reference plane; calculating a height of each of the pixels in the depth image relative to the reference plane based on the viewing angle and depth information and the at least two marker points on the reference plane; and converting the depth image into the height map based on the calculated height of each of the pixels in the depth image relative to the reference plane.

In the method for detecting an object stacking state according to some embodiments of the present disclosure, the determining the reference height of the object based on the height map and the area occupied by the object comprises: determining a height of each of the pixels in the area occupied by the object relative to the reference plane based on the height map; grouping the pixels based on their heights relative to the reference plane and calculating the number of pixels in each group; determining whether a ratio of the number of pixels in the group with the largest number of pixels to all the pixels in the area occupied by the object exceeds a first threshold; determining the height of the pixels in the group with the largest number of pixels relative to the reference plane as the reference height of the object, in response to the ratio of the number of pixels in the group with the largest number of pixels to all the pixels in the area occupied by the object exceeding the first threshold; determining whether a ratio of the number of pixels in the group with the largest height of the pixels relative to the reference plane to all the pixels in the area occupied by the object exceeds a second threshold, in response to the ratio of the number of pixels in the group with the largest number of pixels to all the pixels in the area occupied by the object not exceeding the first threshold; and determining the largest height the pixels relative to the reference plane as the reference height of the object, in response to the ratio of the number of pixels in the group with the largest height of the pixels relative to the reference plane to all the pixels in the area occupied by the object exceeding the second threshold.

In the method for detecting an object stacking state according to some embodiments of the present disclosure, the comparing the reference height of the object with the actual height of the object and judging the stacking state of the object based on a result of the comparing comprises: calculating an absolute value of a difference between the reference height and the actual height; judging that the object is in the stacking state in response to the absolute value of the difference being greater than an error threshold; and judging that the object is not in the stacking state in response to the absolute value of the difference being less than or equal to the error threshold.

According to a second aspect of the present disclosure, a device for detecting an object stacking state is provided, comprising:

a capturing component configured to capture a color image and a depth image that are aligned with each other above a reference plane in which the object is located;

an identifying component configured to identify an object and an area occupied by the object in the color image;

a converting component configured to convert the depth image into a height map relative to the reference plane;

a determining component configured to determine a reference height of the object based on the height map and the area occupied by the object;

an acquiring component configured to acquire an actual height of the object based on the identified object; and a judging component configured to compare the reference height of the object with the actual height of the object and judge a stacking state of the object based on a result of the comparing.

In the device for detecting the object stacking state according to some embodiments of the present disclosure, the capturing component comprises one or more RGBD cameras or at least two RGB cameras.

In the device for detecting the object stacking state according to some embodiments of the present disclosure, the determining component comprises:

a first determining sub-component configured to determine a height of each of pixels in the area occupied by the object relative to the reference plane based on the height map;

a grouping sub-component configured to group the pixels based on their heights relative to the reference plane and calculating the number of pixels in each group; and a second determining sub-component configured to: determine whether a ratio of the number of pixels in the group with the largest number of pixels to all the pixels in the area occupied by the object exceeds a first threshold; determine the height of the pixels in the group with the largest number of pixels relative to the reference plane as the reference height of the object, in response to the ratio of the number of pixels in the group with the largest number of pixels to all the pixels in the area occupied by the object exceeding the first threshold; determine whether a ratio of the number of pixels in the group with the largest height of the pixels relative to the reference plane to all the pixels in the area occupied by the object exceeds a second threshold, in response to the ratio of the number of pixels in the group with the largest number of pixels to all the pixels in the area occupied by the object not exceeding the first threshold; and determine the largest height of the pixels relative to the reference plane as the reference height of the object, in response to the ratio of the number of pixels in the group with the largest height of the pixels relative to the reference plane to all the pixels in the area occupied by the object exceeding the second threshold.

According to a third aspect of the present disclosure, an intelligent shelf is provided, comprising: a shelf body comprising shelf laminate for placing objects; and a device for detecting an object stacking state according to some embodiments of the present disclosure, wherein the reference plane is the shelf laminate.

In the intelligent shelf according to some embodiments of the present disclosure, the device for detecting the object stacking state is located above the shelf laminate.

In the intelligent shelf according to some embodiments of the present disclosure, the intelligent shelf further comprises a detecting component that is configured to detect the position and orientation of the capturing component.

In the intelligent shelf according to some embodiments of the present disclosure, the detecting component comprises at least one of an accelerometer and a gyroscope.

According to a fourth aspect of the present disclosure, an intelligent shelf system is provided, comprising:

a shelf comprising a shelf body and an image capture component, wherein the shelf body comprises shelf laminate for placing objects and the image capture component is configured to acquire an color image and a depth image that are aligned with each other above the laminate; and a computing device communicatively connected to the image capture component, comprising:

an identifying module configured to identify an object and an area occupied by the object in the color image;

a converting module configured to convert the depth image into a height map relative to a reference plane;

a determining module configured to determine a reference height of the object based on the height map and the area occupied by the object;

an acquiring module configured to acquire an actual height of the object based on the identified object; and a judging module configured to compare the reference height of the object with the actual height of the object and judge a stacking state of the object based on a result of the comparing.

According to a fifth aspect of the present disclosure, a computer readable storage medium is provided having stored thereon computer readable instructions which, when executed, perform the method for detecting an object stacking state according to some embodiments of the present disclosure.

BRIEF DESCRIPTION OF THE DRAWINGS

The specific embodiments of the present disclosure will be further described in detail below with reference to the accompanying drawings.

DETAILED DESCRIPTION OF THE DISCLOSURE

In order to illustrate the present disclosure more clearly, the present disclosure will be further described in conjunction with preferred embodiments and the accompanying drawings. Like numbers refer to like parts throughout the drawings. It should be understood by those skilled in the art that the following detailed description is illustrative rather than restrictive, and is not intended to limit the scope of the disclosure.

The figures are not drawn to scale. For a purpose of clarity, some details are exaggerated and some details may be omitted in the figures. The various areas, shapes of the layers, and the relative size and positional relationship between them are merely exemplary, and may actually be deviated due to manufacturing tolerances or technical limitations, and those skilled in the art may design areas/layers of different shapes, sizes, and relative positions according to actual requirement.

In the image recognition based solution in the related art, the quantity statistics of goods on a shelf are mainly performed by object identification in the image. However, image recognition cannot overcome the occlusion problem, that is, it is impossible to accurately identify the stacking of items, which makes it difficult to guarantee the validity of the quantity statistics. In view of this, the present disclosure provides a method for detecting an object stacking state capable of overcoming the above problems.

It should be noted that "pixel height" herein refers to a distance from a position in an actual scene corresponding to a pixel in an image (for example, color image or depth image) to a reference plane, and "pixel depth" herein refers a distance from a position in an actual scene corresponding to a pixel in an image to a lens plane of an image capture device.

Figure 1:
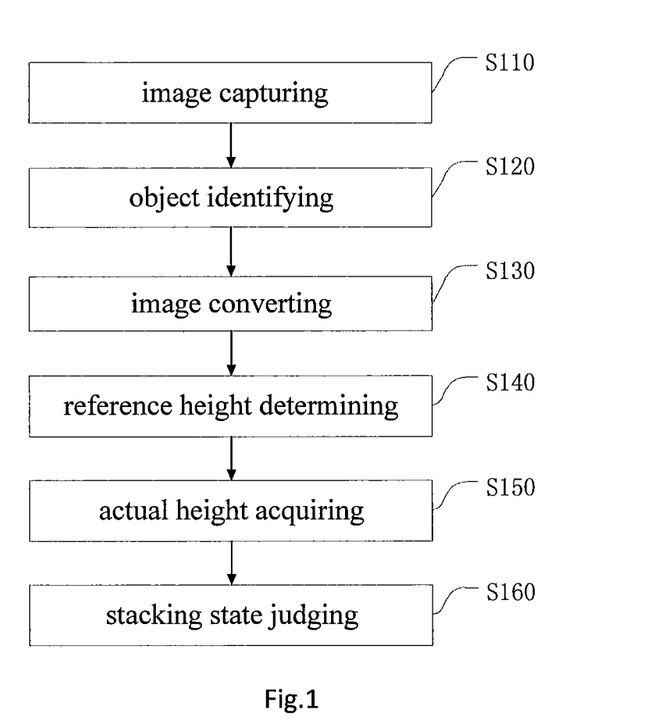
FIG. 1 schematically shows a flowchart of a method for detecting an object stacking state according to some embodiments of the present disclosure, FIG. 2a and FIG. 2b schematically show a flowchart and a mathematical schematic diagram of an image conversion step in the method for detecting an object stacking state according to some embodiments of the present disclosure, respectively, FIG. 3a and FIG. 3b schematically show a flowchart and a mathematical schematic diagram of an image conversion step in the method for detecting an object stacking state according to further embodiments of the present disclosure, respectively, FIG. 4 schematically shows a flowchart of a reference height determination step in the method for detecting an object stacking state according to some embodiments of the present disclosure, FIG. 5 schematically shows a block diagram of a device for detecting an object stacking state according to some embodiments of the present disclosure, FIG. 6 schematically shows a structural diagram of an intelligent shelf according to some embodiments of the present disclosure.

FIG. 1 is a flowchart illustrating a method for detecting an object stacking state according to some embodiments of the present disclosure.

An example application of the method for detecting the object stacking state according to some embodiments of the present disclosure may be to detect a stacking state of goods or items on a (intelligent) shelf in a store, a supermarket, or a logistics warehouse, that is, to detect whether goods or items are stacked or not. For example, the detecting method can be implemented by using a device for detecting an object stacking state (see FIG. 5 and its corresponding description) on an intelligent shelf in a store, a supermarket, or a logistics warehouse or the like. Generally, an objects may refer to object whose stacking state is to be detected, such as goods, items, and the like on a shelf; a plane for placing the objects is referred to as a reference plane, such as a laminate on the shelf for placing goods or items. The detection of the "object stacking state" refers to detecting whether the objects are stacked on each other, thereby assisting in the quantity statistics of the objects (for example, goods) and improving the accuracy of statistics. For example, when the goods are counted, the stacked items can be removed or marked, thereby reducing the influence of the stacking of goods on the quantity statistics of the goods, and the merchants can be reminded to return the stacked goods as needed, which is beneficial to management of shelf goods.

A method for detecting an object stacking state according to some embodiments of the present disclosure shown in FIG. 1 will be described in detail below. As shown in FIG. 1, the method for detecting an object stacking state comprises the following steps S110-S150.

S110, image capturing step: capturing a color image and a depth image that are aligned with each other above a reference plane in which the object is located.

The method for detecting the object stacking state according to some embodiments of the present disclosure starts from image capturing. The image collector can generally be placed above the reference plane (e.g., the laminate of a shelf) in which the object (e.g., good on a shelf) is located to capture an image of the object at a top view, i.e., to capture an image of its top surface. The captured images comprise a color image and a depth image. Taking the items or goods placed on the shelf as an example, by capturing the top image of the goods on the shelf, the height of the goods can be obtained through image processing and analysis, thereby judging the stacking state.

In general, the color image can be captured by a common image capturing component such as a camera, while the depth image can be obtained by an active ranging manner or a passive ranging manner. In the active ranging manner, the image capturing step S110 can be performed using an image collector or an image capturing component such as an RGBD camera. The RGBD camera can simultaneously acquire a color image and a depth image. The depth image is also called a distance image, which refers to an image that take a distance (depth) from the image collector to each point in the scene as a pixel value, which directly reflects a geometry of a visible surface of the object. The depth in the depth image can be calculated by emitting infrared structured light and receiving a beam of light that is reflected back by the object, thereby calculating the distance from the camera to the object, i.e. the depth, by detecting the flight (round trip) time of the beam. The RGBD camera can work in "aligned" mode to get a color image and a depth image that are "aligned", where "aligned" means that the color image and the depth image have the same width and height, and the pixel values correspond one-to-one.

In the passive ranging manner, an ordinary RGB camera (with no depth image capturing function) can be used to capture a color image of an object area, and then a depth image thereof can be obtained by, for example, a binocular distance measurement. The basic principle of binocular distance measurement is as follows: images of the same scene are respectively captured by two cameras (the two cameras are aligned with each other, that is, in the same camera plane) separated by a certain distance, and then the distance from any point M in the image to the camera plane is calculated based on the principle of parallax and triangle similarity. Specifically, the distance Z from any point M in the image to the camera plane can be obtained by the following formula (1):

$$Z = fT/d \qquad (1)$$

where f is the focal length of each camera, T is the distance between the lenses of the two cameras, d is the parallax, $d = x_1 - x_r$, where $x_1$ and $x_r$ are the abscissas (in the respective coordinate systems) of imaging points of M on the imaging plane of the left and right cameras, respectively Therefore, the distance from any pixel to the camera plane in the color image captured by the camera can be obtained by the above-described passive ranging manner such as binocular distance measurement, thereby obtaining a depth image corresponding to the color image.

S120, object identifying step: identifying the object and an area occupied by the object in the color image.

Generally, the object identification described herein can be understood as using a theory and method in the field of image processing to identify a meaningful object entity such as a person, an object, or the like from an image or video. Image recognition technology is an important field of artificial intelligence. In order to compile a computer program that simulates human image recognition activities, different image recognition models have been proposed. For example, an object in an image can be identified based on a deep neural network (DNN). Specifically, the VGG16 network model can be trained by using a convolutional neural network learning framework (Caffe) to obtain an object identification model for identifying objects in the color image.

Generally, the result of the object identification may include the kind of the object, the contour of the object, or the area occupied by the object in the image, and the like. These results will play an important role in subsequent steps. Taking goods on a shelf as an example, it is possible to obtain the kind of goods in the image through image recognition, and then the various attributes of the goods, such as the size (e.g. length, width, and height), can be known from the database of the store or supermarket.

In some embodiments of the present disclosure, the color image and the depth image are aligned with each other, that is, the coordinates of the pixels in the color image and the coordinates of the pixels in the depth image are in one-to-one correspondence. When performing the analysis of the depth image, the area occupied by the object in the depth image may be determined directly based on the object contour or the coordinates of the occupied area identified in the color image. That is to say, although the color image and the depth image are two kinds of images, since the two are aligned with each other, once the area occupied by the object is identified in the color image, the area occupied by the object in the depth image can be obtained directly based on the coordinates correspondence without identifying again in the depth image.

S130, image converting step: converting the depth image into a height map relative to a reference plane.

The height map relative to the reference plane is a map characterizing the distance from the actual position in the scene corresponding to each of the pixels in the color image or the depth image to the reference plane. Similar to the depth image, each pixel in the height map represents the height of the actual position corresponding to the pixel relative to the reference plane, i.e. the distance to the reference plane. For example, the height of the actual position in the scene corresponding to each of the pixels in the height map may be represented by a different color, such as a light color indicating a lower height and a dark color representing a higher height. Therefore, the height of the actual position corresponding to each of the pixels of the depth image can be clearly obtained from the height map. In this way, the height of the pixel in the object area relative to the reference plane is determined in conjunction with the object contour identified in step S120 or the area occupied by the object in the color image, thereby obtaining the reference height of the object.

Regarding how to convert a depth image into a height map, the height of the pixel relative to the reference plane can be obtained based on the depth information of the pixel in the depth map combined with simple geometric and trigonometric principle. Specific methods can be seen in FIG. 2a-2b, FIGS. 3a-3b and their corresponding descriptions. Of course, in addition to the methods described herein, the height map can be obtained in other ways.

S140, reference height determining step: determining a reference height of the object based on the height map and the identified area occupied by the object.

After the height map is obtained, the area occupied by the object in the height map or the height of each of the pixels in the object area relative to the reference plane may be determined based on the area occupied by the object identified in the color image and the depth image. After the heights of the pixels in the object area is obtained, the reference height of the object can be determined based on the pixel height values in the following two ways.

On the one hand, for an object whose top surface is parallel or substantially parallel to the reference plane, the reference height of each of the pixels should be essentially the same when there is no stacking. When the reference heights of the pixels in the object area are the same or are similar (for example, the error does not exceed a certain threshold), the reference heights can be considered as the reference height of the object.

On the other hand, for the case where the top surface is not parallel to the reference surface, or even not a flat surface (e.g., a mineral water bottle, etc.), the reference heights of the pixels in the area of the object can be different, and the reference height of the object can be determined by the following method: first, the pixels are grouped according to height, that is, the pixels of the same height are grouped into one group; secondly, the number of pixels of each group is calculated; then, the pixel height in the group with larger number of pixels and larger height is determined as the reference height of the object. The above method is based on the following insight: for an object of a non-planar top surface, on the one hand, taking a mineral water bottle as an example, the object area identified by the camera is actually a top view area where the camera shoots from top to bottom, which comprises the top surface (i.e. the cap portion) and a part of the side surface (e.g. the tapered side portion); in this case, the highest part, i.e. the cap portion, should be used as the reference height for the mineral water bottle, while the rest lower part (i.e., the side portion) can be ignored; on the other hand, taking a can drink as an example, an edge portion is higher than a middle portion at the top, but the edge portion occupies a smaller area (i.e., there are fewer pixels), while the middle portion occupies a larger area (i.e., there are more pixels), and in this case the height of the pixels in the middle portion should be considered as the reference height of the object.

Of course, in addition to the above, the reference height of the object can be determined by other methods. For example, for a more specific calculation method of the object reference height reference can be made to FIG. 4 and its corresponding description.

S150, actual height acquiring step: acquiring an actual height of the object based on the identified object.

After identifying the object in the color image, the actual height can be determined based on the identified object. For example, for a scene of an intelligent shelf in a supermarket, the attributes (e.g., name, category, origin, size, price, etc.) of the object (i.e., goods) on the shelf are previously stored in a computer system (e.g., a server) of the supermarket, so when the goods on the shelf is identified, the attributes data such as the actual height of the item can be retrieved from the supermarket's computer system.

S160, stacking state judging step: comparing the reference height of the object with the actual height of the object and judging the object stacking state on the reference plane based on a result of the comparing.

After the reference height of the object is determined, it can be compared with the actual height of the identified object to judge the stacking state. Generally, the specific manner to determine the stacking state by height comparison is as follows: if the reference height is very close to the actual height, it can be determined that the object is not in a stacking state; if the difference is large, for example, the reference height is much larger than the actual height (for example, the reference height is two times of the actual height or more), it can be determined that the object is in a stacking state.

In some embodiments, since certain errors may occur during image recognition, conversion and calculation, an error threshold may be set in order to prevent misjudging, and the error within the error threshold may be considered to be error during the data processing process, which can be omitted. Specifically, the stacking state judging step S160 may comprise: calculating an absolute value of a difference between the reference height and the actual height; determining that the object is in a stacking state in response to the absolute value of the difference being greater than the error threshold; and determining that the object is not in a stacking state in response to the absolute value of the difference being less than or equal to the error threshold. Optionally, the reference height and the actual height may be compared in other ways to determine the stacking state of the object, such as calculating the ratio of the two, if it is close to 1, the object is not in the stacking state; if it is significantly greater than 1, the object is in the stacking state. Further, it is also possible to determine a more specific stacking state based on the difference between the reference height and the actual height or the magnitude of the ratio. For example, when the ratio of the reference height to the actual height is close to 2, the number of stacked layers is 2; when the ratio of the reference height to the actual height is close to 3, the number of stacked layers is 3, and so on.

In the method for detecting the object stacking state according to some embodiments of the disclosure, by simultaneously collecting color image and depth image of object, information such as object contour and its type can be identified in color image, and corresponding height map (relative to reference plane) can be obtained based on the depth information of pixels in depth image, thus the reference height of the object can be determined based on the combination of height information and the identification of object, and then determine whether the items are stacked, thus assisting the quantitative statistics, improving the accuracy of the quantitative statistics of goods. In this method, besides the use of image capturing device to capture color images and depth images, the judgment of stacking state is completed by simple elementary mathematical operations, with relatively small amount of calculation and high efficiency.

Figure 2A:
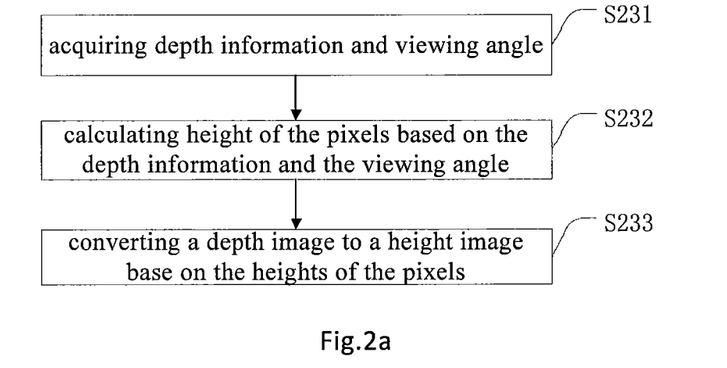
Figure 2B:
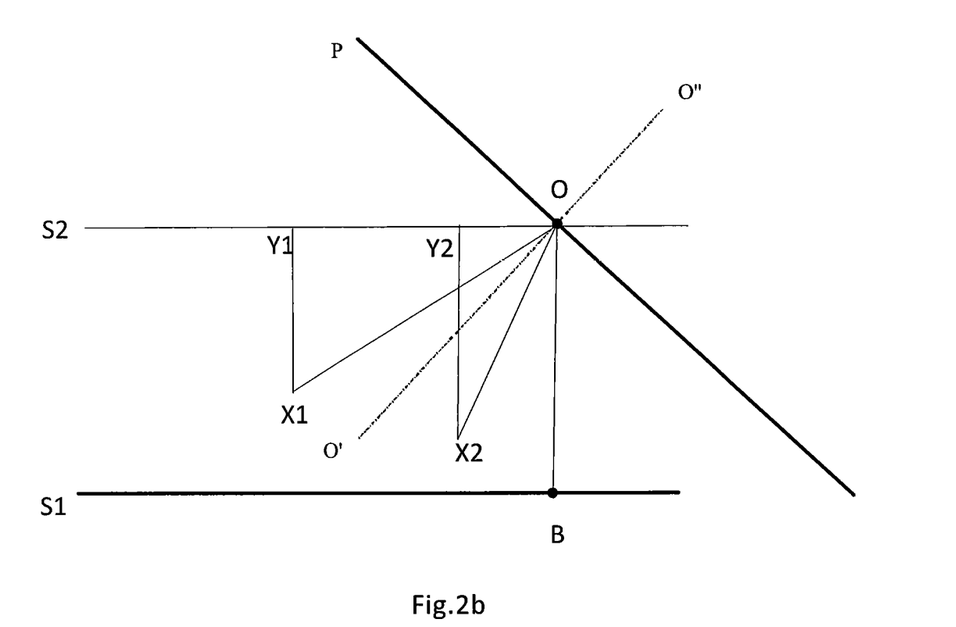

FIG. 2a shows a flowchart of the step 130-image conversion in the method for detecting the object stacking state shown in FIG. 1 according to some embodiments of the present disclosure. FIG. 2b shows the mathematical schematic diagram of the image conversion steps shown in FIG. 2a.

As shown in FIG. 2a, the image conversion step shown in FIG. 1 comprises S231-S233.

S231: acquiring depth information and a viewing angle of each of the pixels in the depth image.

First, in the depth image, the depth information of any pixel can be directly obtained, since the depth image is an image reflecting the depth of the scene.

Secondly, in the depth image, the viewing angle of a certain pixel (i.e., the angle between the line connecting the point and the lens center point of the image capture device and the optical axis of the lens) can be obtained by the following formula (2):

$$a = d*FOV/D \quad (2)$$

where d represents a distance from the point to the imaging center in the image, D represents a diagonal distance of the image, FOV is a lens parameter (a viewing angle of the lens). More specifically, the vertical viewing angle, i.e., the vertical component of the viewing angle can be used herein, where d represents the distance from the point to the horizontal line of the imaging center, D represents the image height, and FOV is the vertical viewing angle of the lens.

Therefore, for any pixel in the depth image, after obtaining its specific position, its viewing angle can be obtained based on the above formula (2).

S232: calculating a height of the actual position in the scene corresponding to each of the pixels in the depth image relative to the reference plane, based on the depth information and the viewing angle.

As shown in FIG. 2b, it is assumed that X1 is the actual position (e.g., the top surface of the item on the shelf) in the scene (i.e., the imaging area) corresponding to any pixel in the depth image, and O is the position (above X1) where the camera is located, O'O" is the optical axis of the camera, P is the camera plane; S1 is the reference plane (e.g., the laminate on which the items are placed on the shelf), S2 is a plane, in which the camera is located, parallel to the reference plane, and Y1 is the intersection of the perpendicular line from the point X1 to the plane S2 and plane S2, and OB is the distance between the planes S1 and S2. The calculation process of the reference height of point X1 with respect to plane S1 is as follows:

firstly, since the camera position O and the reference plane S1 are fixed, the distance from O to S1, i.e., the length of the OB, is known, and the angle ∠'POY1 between the camera plane P and S2 is known;

secondly, based on the specific position of X1 in the depth image, the depth of the X1 point (i.e., the distance from X1 to the camera plane P), and the viewing angle of the point X1 relative to the camera (i.e., ∠X1OO') can be obtained, thus the distance X1O from the X1 point to the O point can be calculated based on the definition of trigonometric function;

thirdly, since the optical axis OO' is perpendicular to the plane P, ∠X1OY1=π/2−∠X1OO'−∠POY1;

finally, based on the trigonometric function relationship, the reference height of the point X1 (i.e., the distance from X1 to S1) is obtained by: OB−X1Y1=OB−X1O*sin∠X1OY1.

Similarly, as shown in FIG. 2a, for any other point X2 in the scene (the difference is that X1 is located on the left side of the optical axis OO' and X2 is located on the right side of the optical axis OO'), by adopting the above calculation process, its reference height can also be obtained by: OB−X2Y2+OB−X2O*sin ∠X2OY2, where ∠X2OY2=π/2+∠X2OO'−∠POY2, and ∠X2OO' is the viewing angle of X2 relative to the camera.

S233: converting the depth image into a height map based on the calculated height of the actual position relative to the reference plane corresponding to each of the pixels in the depth image.

Based on the above, the heights of the actual positions of the scene corresponding to all pixels in the depth image relative to the reference plane can be obtained, so that each of the pixel values (such as color or gray scale) representing the depth in the depth image can be converted to the pixel value that reflect the distance or height of each point relative to the reference plane in the corresponding scene. In this way, the depth image will be converted to a height map.

Figure 3A:
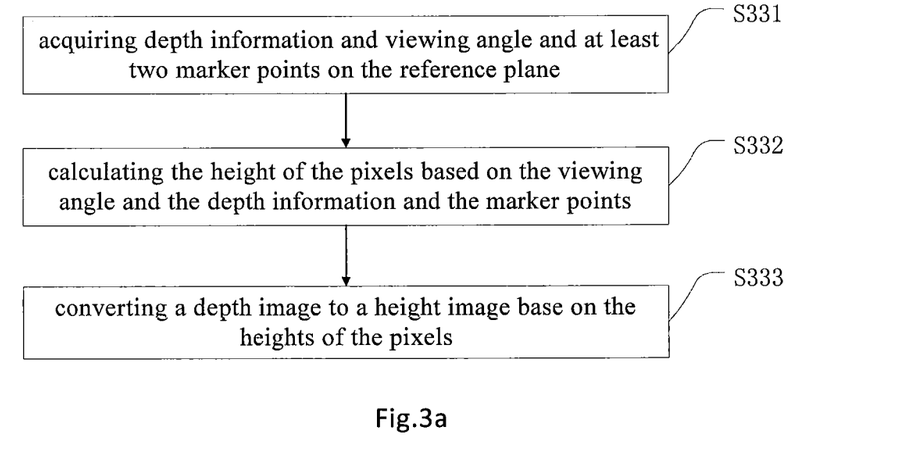
Figure 3B:
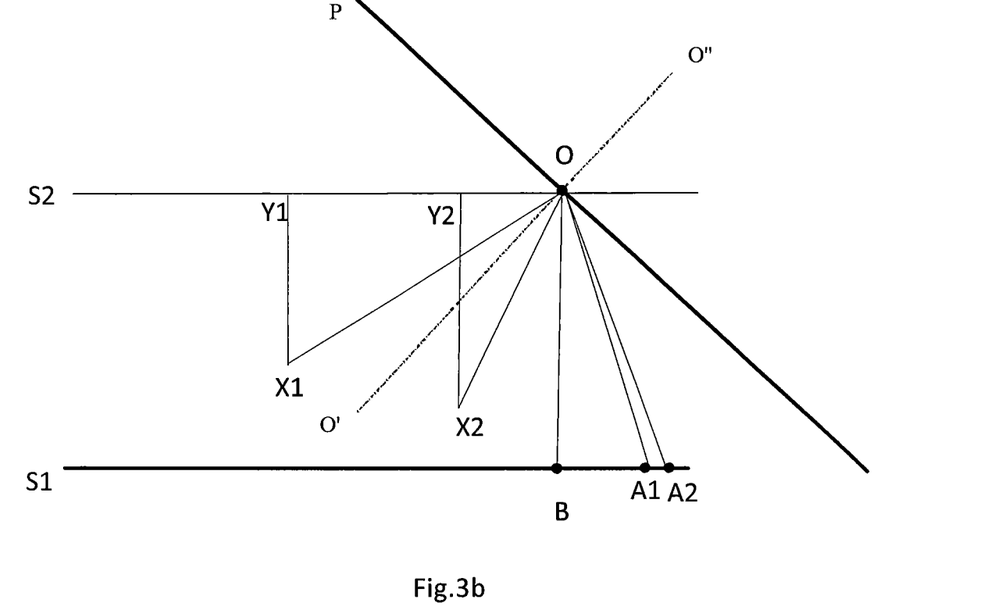

FIG. 3a shows a flowchart of the step 130-image conversion in the method for detecting the object stacking state shown in FIG. 1 according to further embodiments of the present disclosure. FIG. 3b shows a mathematical schematic diagram of the image conversion steps shown in FIG. 3a.

As shown in FIG. 3a, the image conversion step shown in FIG. 1 comprises S331-S333.

S331: acquiring depth information and a viewing angle of each of the pixels in the depth image and at least two marker points on the reference plane.

Here, the acquiring the depth information and the viewing angle of each of the pixels in the depth image is the same as that of S231 in FIG. 2a, and therefore will not be described again.

Furthermore, as shown in FIG. 3b, two marker points A1 and A2 are added compared to FIG. 2b. When the position and orientation of the camera for image capturing are variable (non-fixed), the corresponding camera center point O and camera plane P are variable, so that a fixed OB and ∠'POY1 cannot be obtained in advance. In this case, OB and ∠'POY1 can be calculated using the fixed marker points A1 and A2 on the plane S1. As shown in FIG. 3b, two mark points A1 and A2 on the plane S1 in the depth image may be taken such that A1 and A2 are in the same plane as the optical axis OO'. Specifically, a strip-shaped marker A (with a negligible thickness) may be placed on the reference plane S1, and A1 and A2 are respectively located on the two edges of the marker parallel to the side edges of the reference plane S1 (e.g., the laminate of the shelf). Then, the depths of the pixels corresponding to the two edges can be obtained by the depth image, and then the two points corresponding to the minimum depth of all the pixels on the respective edges are selected as A1 and A2, and thus the determined A1 and A2 can satisfy the requirement that they are coplanar with the optical axis OO'.

S332: calculating the height of the actual position in the scene corresponding to each of the pixels in the depth image relative to the reference plane based on the viewing angle and the depth information and the two marker points on the reference plane.

Firstly, based on the principle similar to FIG. 2b and the specific positions of the marker points A1 and A2 in the depth image, with the depth information and the viewing angle, the values of A1A2, A1O, and A2O can be obtained, and thus $$\angle A1A2O = \arccos \frac{A1A2^2 + A2O^2 - A1O^2}{2A1A2^2 + A2O^2}$$

can be obtained based on the cosine theorem in the trigonometric function. In this way, based on the trigonometric function relationship, BO=A2O*∠A1A2O.

Secondly, ∠O'OC1=∠A2OO'+∠A1A2O, then ∠X1OY1=π−∠O'OC1−∠X1OO', ∠X2OY2=π−∠O'OC1+∠X2OO'.

Finally, based on the trigonometric function relationship, the distances from X1 and X2 to plane S1 respectively are: OB−X1Y1=OB−X1O*sin ∠X1OY1, OB−X2Y2=OB−X2O*sin ∠X2OY2.

S333: converting the depth image into a height map based on the calculated height of the actual position corresponding to each of the pixels in the depth image. Obviously, this step S333 is the same as S233 of FIG. 2a.

Figure 4:
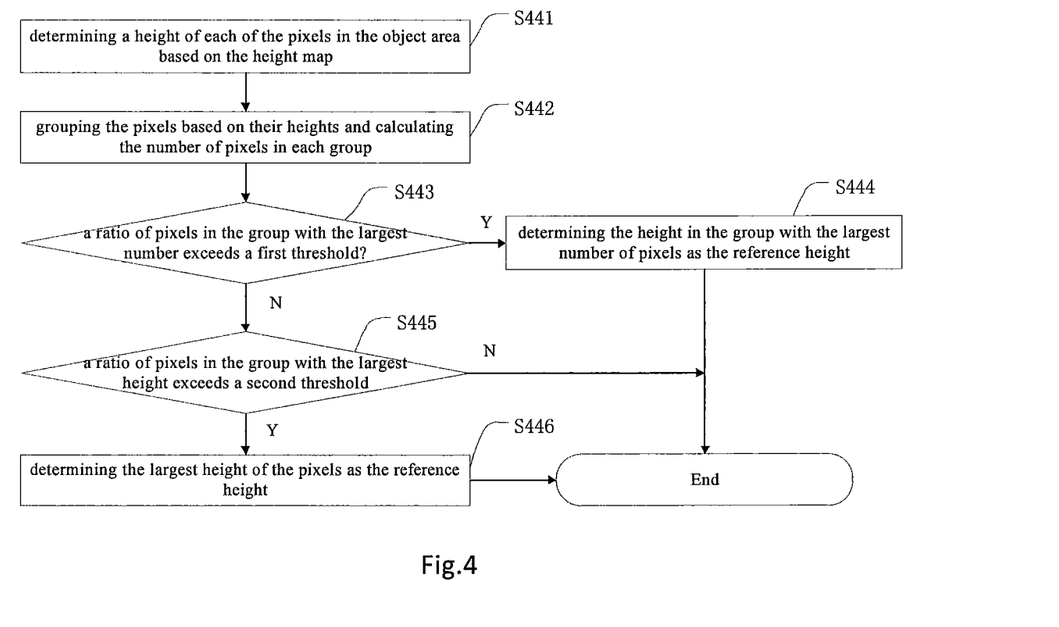

FIG. 4 shows a flowchart of step S140-reference height determining in the method for detecting the object stacking state shown in FIG. 1 according to some embodiments of the present disclosure.

As shown in FIG. 4, the reference height determining step S140 shown in FIG. 1 comprises S441-S445. Steps S441-S445 will be described in detail below.

S441: determining a height of the actual position in the scene corresponding to each of the pixels in the object area based on the height map After obtaining the height map, the height of the actual position in the scene corresponding to each of the pixels can be obtained directly from the area occupied by the object in the height map or the object area based on the area occupied by the object identified in the color image and the depth image. In other words, the height values of a plurality of points in the object area relative to the reference plane can be obtained from the height map. Subsequently, it is necessary to analyze and filter the height values to obtain the reference height of the object.

S442: grouping the pixels based on their heights and calculating the number of pixels in each group.

After the pixel heights in the object area are determined, the pixels can be grouped, that is, the pixels of the same height are grouped into the same group. In this way, the pixels in the object area can be divided into groups of different heights, and then the reference height of the object is determined according to the number of pixels and/or the height of the pixels in each group. In particular, the reference height can be determined in different ways for different situations, such as an object of a regular shape, in particular an object whose top surface is parallel or substantially parallel to the reference plane, or an object of an irregular shape, whose top surface is not parallel to a reference surface, even not a flat surface (such as a mineral water bottle, etc.).

S443: determining whether a ratio of the number of pixels in the group with the largest number of pixels to all the pixels in the area occupied by the object exceeds a first threshold, and if yes, proceeds to step S444, otherwise proceeds to step S445.

S444: determining the height of the pixels in the group with the largest number of pixels as the reference height of the object, in response to the ratio of the number of pixels in the group to all the pixels exceeding the first threshold.

For an object whose top surface is parallel or substantially parallel to the reference plane, the height of each of the pixels should be the same without stacking. Therefore, when the height of each of the pixels in the object area is the same or is similar (for example, the error does not exceed a certain threshold), the height of the pixels can be considered as the reference height of the object. In order to prevent the singular value from affecting the accuracy of the judgment, the pixels of the same height can be grouped into one group, and then count the number of pixels in each group, and take the height of the group with the largest number of pixels as the reference height of the object, if the number of pixels is large enough (or dominant), for example, the ratio exceeds the first threshold. The first threshold may be predetermined, for example, may be 90%, 95% or even 99% or more.

S445: determining whether a ratio of the number of pixels in the group with the largest height of the pixels to all the pixels in the area occupied by the object exceeds a second threshold, in response to the ratio of the number of pixels in the group with the largest number of pixels to all the pixels not exceeding the first threshold, and if yes, proceed to S446, if no, then end.

For the case where the top surface is not parallel to the reference surface, or even not a flat surface (such as a mineral water bottle, etc.), the height of each of the pixels in the object area is different or the number of pixels of each group does not exceed the first threshold. In this case, the reference height of the object can be determined by determining the pixel height in the group with a larger number of pixels and the largest height as the reference height of the object. This is based on the following idea: for an object of a non-planar top surface, on the one hand, taking a mineral water bottle as an example, the object area identified by the camera is actually a top view area where the camera shoots from top to bottom, which comprises the top surface (i.e. the cap portion) and a part of the side surface (e.g. the tapered side portion); in this case, the highest part, i.e. the cap portion, should be used as the reference height for the mineral water bottle, while the rest lower part (i.e., the side portion) can be ignored; on the other hand, taking a can drink as an example, an edge portion is higher than a middle portion at the top, but the edge portion occupies a smaller area (i.e., there are fewer pixels), while the middle portion occupies a larger area (i.e., there are more pixels), and in this case the height of the pixels in the middle portion should be considered as the reference height of the object.

Therefore, when the conditions of the step S443 cannot be satisfied, the conditions can be appropriately relaxed. Thus, the preset second threshold should generally be slightly less than the first threshold, for example 85%, 80% or more or less. When the number of pixels in the group with the highest pixel height is greater than the second threshold, the height of pixels in the group may be determined as the reference height of the object.

S446: determining the height in the group with the largest height of the pixels as the reference height of the object, in response to the ratio of the number of pixels in the group with the largest height of the pixels to all the pixels exceeding the second threshold.

Figure 5:
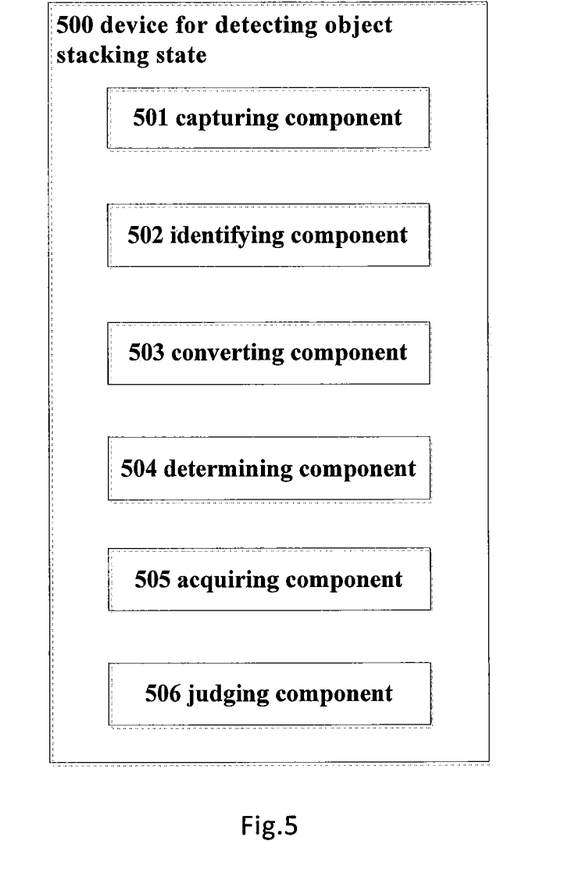

FIG. 5 schematically shows a block diagram of a device for detecting an object stacking state according to some embodiments of the present disclosure. As described above, the method for detecting the object stacking state according to some embodiments of the present disclosure can be achieved by the device 500 for detecting the object stacking state similar to that shown in FIG. 5. As shown in FIG. 5, the device 500 comprises:

a capturing component 501 configured to capture a color image and a depth image that are aligned with each other above a reference plane in which the object is located;

an identifying component 502 configured to identify an object and an area occupied by the object in the color image;

a converting component 503 configured to convert the depth image into a height map relative to the reference plane;

a determining component 504 configured to determine a reference height of the object based on the height map and the area occupied by the object;

an acquiring component 505 configured to acquire an actual height of the object based on the identified object; and a judging component 506 configured to compare the reference height of the object with the actual height of the object and judge a stacking state of the object based on a result of the comparing.

In some embodiments of the device for detecting the object stacking state according to the present disclosure, the capturing component 501 can comprise at least two common image capturing devices, such as normal cameras or RGB cameras, which can directly capture color images and obtain depth images by a passive ranging manner such ad binocular distance measurement. Optionally, the capturing component 501 can also comprise an RGBD camera with a depth image capturing function that can simultaneously capture color images and depth images.

Regarding the operation method of the device for detecting the object stacking state shown in FIG. 5, reference may be made to the method for detecting the object stacking state according to some embodiments of the present disclosure shown in FIG. 1, as described above.

Figure 6:
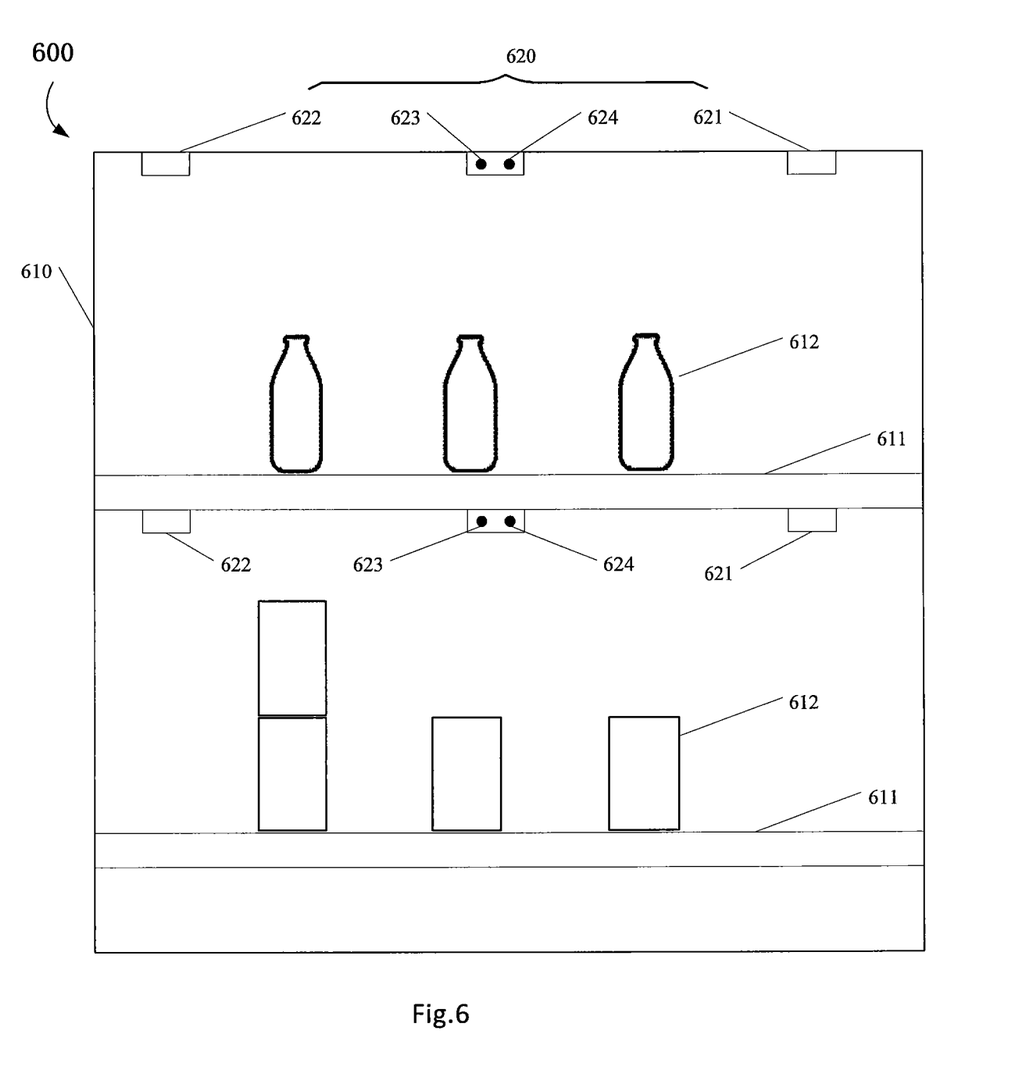

FIG. 6 shows a structural diagram of an intelligent shelf according to some embodiments of the present disclosure. As shown in FIG. 6, the intelligent shelf 600 comprises: a shelf body 610 comprising shelf laminates 611 disposed layer-by-layer for placing objects; and a device 620 for detecting an object 612 stacking state disposed above each shelf laminate 611, which may comprise at least one camera 621-622, memory 623 and processor 624. As shown in FIG. 6, the at least one camera 621-622 may comprise a first camera 611 disposed at the upper right of the shelf and a second camera 622 disposed at the upper left of the shelf. The two cameras can acquire depth images and color images of the object 612 (e.g., items or goods) to be detected from different shooting angles. It should be understood by those skilled in the art that the number of cameras comprised in the device 620 for detecting the object stacking state in the intelligent shelf 600 is not limited to two, but an appropriate number can be selected according to the accuracy of the recognition and the specific application scenario. The cameras 621-622 may be RGBD cameras for simultaneous capturing color images and depth images. In the intelligent shelf 600, the position and angle of RGBD cameras 621-622 are typically adjustable to enable them to capture scenes on respective shelf laminates. Of course, as described above, the cameras 621-622 can also capture the color images of the shelf scene using ordinary RGB cameras (with no depth image capturing function), and then obtain depth images based on a passive ranging manner such as binocular distance measurement. When using a normal camera and a binocular distance measurement, the number of cameras should be at least two.

As shown in FIG. 6, the memory 623 and the processor 624 may be integrally provided and disposed on one side of the shelf body 610. Additionally, the memory 623 and the processor 624 may also be disposed elsewhere on the shelf body, although not shown. The memory 623 stores computer program instructions that are executable on the processor. The processor 624 can be, for example, an embedded system with data analysis and processing, computing capability for executing computer program instructions stored in the memory 623 to implement the method for detecting the object stacking state described herein. The memory 623 can be implemented by any or a combination of a variety of volatile or non-volatile memory devices, such as static random access memory (SRAM), electrically erasable programmable read only memory (EEPROM), erasable programmable read only memory (EPROM), programmable read only memory (PROM), read only memory (ROM), magnetic memory, flash Memory, disk or optical disk.

Although not shown, the device for detecting the object stacking state may further comprise various input devices (such as user interfaces, keyboards), various output devices (such as speakers), and a display device.

In fact, the device 620 for detecting the object stacking state of the intelligent shelf 600 shown in FIG. 6 may correspond to the device 500 for detecting the object stacking state shown in FIG. 5, wherein the shelf laminate 611 is equivalent to the reference plane; the camera 621-622 is equivalent to the capturing component 501 shown in FIG. 5; and the memory 623 and processor 624 are equivalent to the remaining components 502-506 shown in FIG. 5. The cameras 611-614 are responsible for capturing color images and depth images of objects (goods) on the shelf laminate 611, while the memory 623 and the processor 624 realize the recognition of the object stacking state by a series of data analysis, processing, and calculation operations such as image capturing, object identification, height map conversion, object reference height determination, actual height acquisition, and stacking judgment based on the captured images.

As shown in FIG. 6, if the position and orientation of the cameras 621-622 are adjustable, the intelligent shelf 600 can further comprise a detecting component (not shown) for detecting camera position and orientation.

Generally, the position or orientation of the cameras 621-622 on the shelf 600 is fixed. However, in actual use, the position and orientation of the cameras 621-622 may change due to the attachment and detachment of the shelf 600. Therefore, when the positions and orientations of the cameras 621-622 are adjustable, in order to ensure the reliability of the data, it is necessary to detect the positions and orientations of the cameras 621-622 to determine the optical axis in which the cameras 621-622 are located. In some embodiments, the detecting component can be an accelerometer or a gyroscope.

An accelerometer or gyroscope can be used to record translational and rotational acceleration, respectively. For example, the accelerometer can obtain the offset of the camera by monitoring the horizontal acceleration of the camera in real time, or the camera is mounted on a rotatable shaft, and the gyroscope can obtain the offset of the camera by monitoring the rotational acceleration of the camera in real time. Thus, depending on the resulting offset of the camera combined with its known original position and orientation, the current position and orientation can be derived. Obviously, after the camera is offset, the height conversion should be re-performed based on the new position of the camera according to the principle shown in FIG. 2b or 3b.

Figure 7:
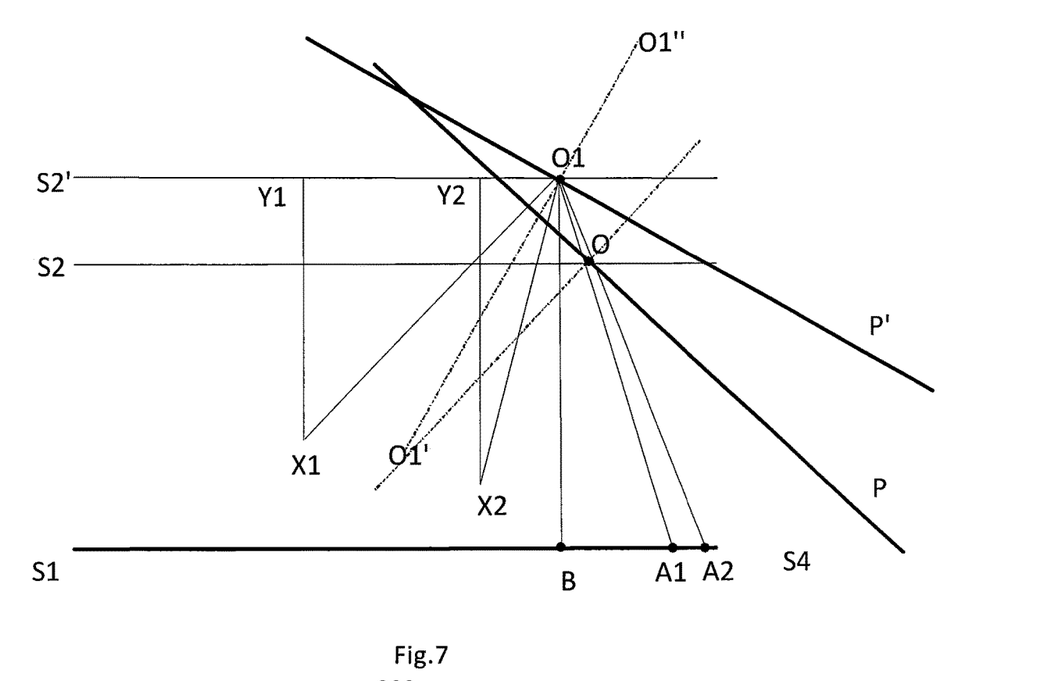
FIG. 7 shows a schematic diagram of camera offset in an intelligent shelf according to some embodiments of the present disclosure, and FIG. 8 schematically shows a block diagram of an intelligent shelf system according to some embodiments of the present disclosure.

FIG. 7 shows a schematic diagram of the optical axis change of the camera. The camera center point changes from O to O1, the optical axis is changed to O1'O1", the plane parallel to the shelf laminate S1 where the camera center point O is located changes from S2 to S2', and the camera plane changes from P to P'. As shown in FIG. 7, it can be known that when the optical axis of the camera is changed, the line where the optical axis is located can be determined again in combination with the amount of change, thereby performing recalculation based on the above method to obtain the height of the object.

Figure 8:
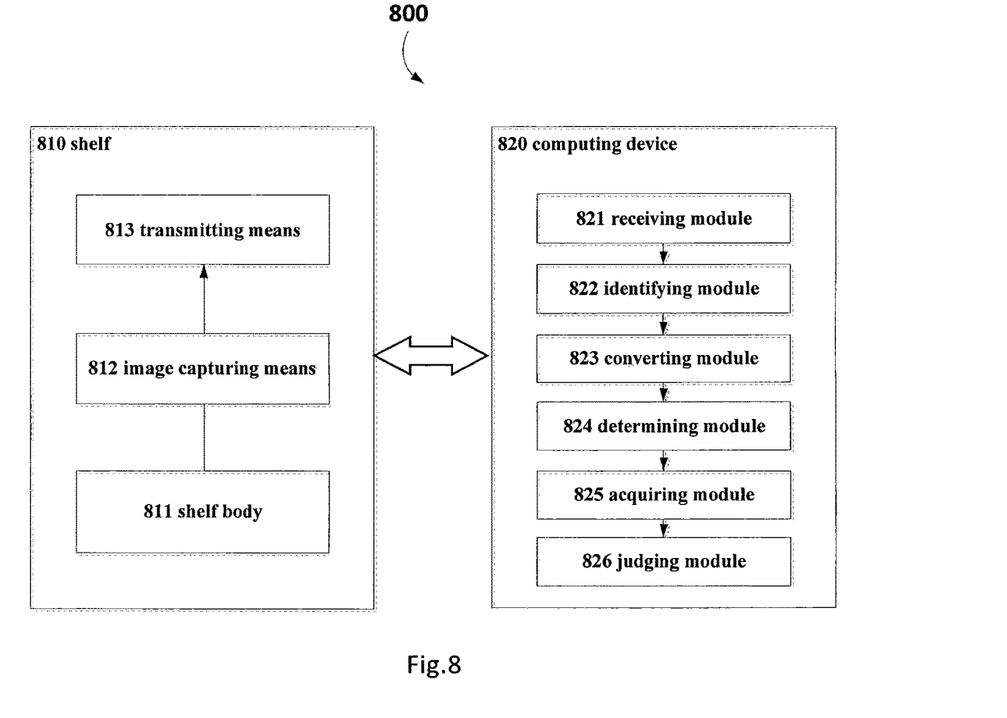

FIG. 8 shows a block diagram of an intelligent shelf system according to some embodiments of the present disclosure. As shown in FIG. 8, the intelligent shelf system 800 comprises a shelf 810 and a computing device 820 in communication with the shelf 810. The shelf 810 may comprise: a shelf body 811 comprising shelf laminates; an image capture means 812 disposed above each shelf laminate, configured to capture color images and depth images; and a transmitting means 813 configured to transmit the captured color images and depth images to the computing device 820. The computing device 820 may comprise: an receiving module 821 configured to receive the color image and the depth image from the shelf 810; an identifying module 822 configured to identify an object and an area occupied by the object in the color image; a converting module 823 configured to convert the depth image into a height map relative to a reference plane; a determining module 824 configured to determine a reference height of the object based on the height map and the area occupied by the object; an acquiring module 825 configured to acquire an actual height of the object based on the identified object; and a judging module 826 configured to compare the reference height of the object with the actual height of the object and judge a stacking state of the object based on a result of the comparing.

Compared to the intelligent shelf 600 shown in FIG. 6, the intelligent shelf system 800 shown in FIG. 8 separate hardware entities (i.e., shelf 810, comprising shelf body 811 and image capture means 812) and software modules (i.e., modules 822-826 of computing devices 820) by placing data (information and image) processing tasks on separate computing devices 820 (e.g., servers). In this way, in the application scenarios of large-scale shelves (for example, large warehouses, supermarkets, shopping malls), it is advantageous to centrally manage and monitor the stacking state of goods or items of the shelves; and the manufacturing cost of a single shelf can be effectively reduced. Moreover, the computing device can employ a large computer or server, which has high processing power and can process data (such as images or information) transmitted by multiple shelves at the same time, thereby significantly improving the working efficiency of the intelligent shelf system 800.

Some embodiments of the present disclosure provide a computer readable storage medium having stored thereon a computer program that, when executed, implements a method for detecting an object stacking state according to some embodiments of the present disclosure.

In the description of the present specification, the descriptions of the terms "one embodiment", "some embodiments", "example", "specific examples", or "some examples" and the like are intended to mean the specific features, structures, materials or characteristics described in connection with the embodiments or examples are comprised in at least one embodiment or example of the present disclosure. In the present specification, the schematic representation of the above terms is not necessarily directed to the same embodiment or example. Furthermore, the specific features, structures, materials, or characteristics described may be combined in a suitable manner in any one or more embodiments or examples. In addition, various embodiments or examples described in the specification, as well as features of various embodiments or examples, may be combined without conflicting.

Moreover, the terms "first" and "second" are used for descriptive purposes only and are not to be construed as indicating or implying a relative importance or implicitly indicating the number of technical features. Thus, features defining with "first" or "second" may comprise at least one of the features, either explicitly or implicitly. In the description of the present disclosure, the meaning of "a plurality" is at least two, such as two, three, etc., unless specifically defined otherwise.

Any process or method description in the flowcharts or otherwise described herein can be understood to represent a module, segment or portion of code comprising one or more executable instructions for implementing the steps of a custom logic function or process. And the scope of the optional embodiments of the present disclosure comprises additional implementations in which the functions may be performed in an order not shown or discussed, e.g., in a substantially simultaneous manner or in the reverse order, depending on the function involved, which will be understood by those skilled in the art.

The logic and/or steps represented in the flowchart or otherwise described herein, for example, may be considered as an ordered list of executable instructions for implementing logical functions, and may be embodied in any computer readable medium to be used by, or in conjunction with, an instruction execution system, apparatus, or device (e.g., a computer-based system, a system comprising a processor, or other system that can fetch and execute instructions from, an instruction execution system, apparatus, or device). In this specification, a "computer-readable medium" can be any apparatus that can contain, store, communicate, propagate, or transport a program for use in an instruction execution system, apparatus, or device, or in conjunction with such an instruction execution system, apparatus, or device. More specific examples of the computer readable medium may comprise, for example, the following: an electrical connection (electronic device) having one or more wires, a portable computer disk (magnetic device), a random access memory, read only memory, erasable programmable read only memory or flash memory, optical fiber devices, and compact disc read only memory. In addition, the computer readable medium may even be a paper or other suitable medium on which the program can be printed, as the paper or other medium may be optically scanned, followed by editing, interpretation or, if appropriate, other suitable manner to obtain the program electronically and then store it in computer memory.

It should be understood that various parts of the present disclosure can be implemented in hardware, software, firmware, or a combination thereof. In the above-described embodiments, multiple steps or methods may be implemented in software or firmware stored in a memory and executed by a suitable instruction execution system. For example, if implemented in hardware, it can be implemented by any one or combination of the following techniques well known in the art: discrete logic circuits with logic gates for implementing logic functions on data signals, ASIC with appropriate combinational logic gates, programmable gate array, field programmable gate array, and the like.

One of ordinary skill in the art will appreciate that all or part of the steps of the above-described embodiments may be performed by hardware associated with program instructions, which may be stored in a computer readable storage medium, comprising, when executed, one or a combination of the steps of the method embodiments.

In addition, each functional unit in various embodiments of the present disclosure may be integrated into one processing module, or each unit may exist physically separately, or two or more units may be integrated into one module. The above integrated modules can be implemented in the form of hardware or in the form of software functional modules. The integrated modules, if implemented in the form of software functional modules and sold or used as separate products, may also be stored in a computer readable storage medium.

It should be noted that, in the claims, the use of the verb "comprising/comprise" and its variants does not exclude the presence of elements or steps not recited in the claims, and the wording "a" or "an" does not exclude a plurality.

While the disclosure has been shown and described with respect to the specific embodiments of the present disclosure, it is apparent to those skilled in the art that several variations and modifications may be made without departing from the disclosure. All such variations and modifications are intended to be comprised within the scope of the claims of the disclosure, as fall within the true spirit and scope of this disclosure.

It should be noted that although several modules or units of device for action execution are mentioned in the detailed description above, such division is not mandatory. Indeed, according to embodiments of the present disclosure, the features and functions of two or more modules or units described above may be embodied in one module or unit. Conversely, the features and functions of one of the modules or units described above may be embodied by means of being further divided into multiple modules or units.

The invention claimed is:

1. A method for detecting a stacking state of an object, comprising:
   capturing a color image and a depth image that are aligned with each other above a reference plane in which the object is located;
   identifying the object and an area occupied by the object in the color image;
   converting the depth image into a height map relative to the reference plane;
   determining a reference height of the object based on the height map and the area occupied by the object;
   acquiring an actual height of the object based on the object that was identified; and
   comparing the reference height of the object with the actual height of the object and judging the stacking state of the object based on a result of the comparing,
   wherein the comparing the reference height of the object with the actual height of the object and judging the stacking state of the object based on the result of the comparing comprises:
   calculating an absolute value of a difference between the reference height and the actual height;
   judging that the object is in the stacking state in response to the absolute value of the difference being greater than an error threshold; and
   judging that the object is not in the stacking state in response to the absolute value of the difference being less than or equal to the error threshold.

2. The method according to claim 1, wherein the capturing the color image and the depth image that are aligned with each other above the reference plane in which the object is located comprises at least one of:
   capturing the depth image by a passive ranging; or
   capturing the depth image by an active ranging.

3. The method according to claim 2, wherein the capturing the depth image by the passive ranging comprises:
   capturing the depth image by a binocular distance measurement.

4. The method according to claim 1, wherein the converting the depth image into the height map relative to the reference plane comprises:
   acquiring depth information and a viewing angle of each of a plurality of pixels in the depth image;
   calculating a height of each of the pixels in the depth image relative to the reference plane based on the depth information and the viewing angle; and
   converting the depth image into the height map based on the height that was calculated of each of the pixels in the depth image relative to the reference plane.

5. The method according to claim 1, wherein the converting the depth image into the height map relative to the reference plane comprises:

acquiring depth information and a viewing angle of each of a plurality of pixels in the depth image and at least two marker points on the reference plane;

calculating a height of each of the pixels in the depth image relative to the reference plane based on the viewing angle and depth information and the at least two marker points on the reference plane; and converting the depth image into the height map based on the height that was calculated of each of the pixels in the depth image relative to the reference plane.

6. The method according to claim 1, wherein the determining the reference height of the object based on the height map and the area occupied by the object comprises:

determining a height of each of a plurality of pixels in the area occupied by the object relative to the reference plane based on the height map;

grouping the pixels based on their heights relative to the reference plane and calculating a number of pixels in each group;

determining whether a ratio of the number of pixels in a group with a largest number of pixels to all the pixels in the area occupied by the object exceeds a first threshold;

determining a height of the pixels in the group with the largest number of pixels relative to the reference plane as the reference height of the object, in response to the ratio of the number of pixels in the group with the largest number of pixels to all the pixels in the area occupied by the object exceeding the first threshold;

determining whether a ratio of the number of pixels in the group with a largest height of the pixels relative to the reference plane to all the pixels in the area occupied by the object exceeds a second threshold, in response to the ratio of the number of pixels in the group with the largest number of pixels to all the pixels in the area occupied by the object not exceeding the first threshold; and determining the largest height of the pixels relative to the reference plane as the reference height of the object, in response to the ratio of the number of pixels in the group with the largest height of the pixels relative to the reference plane to all the pixels in the area occupied by the object exceeding the second threshold.

7. A device for detecting a stacking state of an object, comprising:

an image capturing component, configured to capture a color image and a depth image that are aligned with each other above a reference plane in which the object is located;

an identifying component configured to identify the object and an area occupied by the object in the color image;

a converting component configured to convert the depth image into a height map relative to the reference plane;

a determining component configured to determine a reference height of the object based on the height map and the area occupied by the object;

an acquiring component configured to acquire an actual height of the object based on the object that was identified; and a judging component configured to calculate an absolute value of a difference between the reference height and the actual height, to judge that the object is in the stacking state in response to the absolute value of the difference being greater than an error threshold, and to judge that the object is not in the stacking state in response to the absolute value of the difference being less than or equal to the error threshold.

8. The device according to claim 7, wherein the image capturing component comprises one or more RGBD cameras or at least two RGB cameras.

9. The device according to claim 7, wherein the determining component comprises:

a first determining sub-component configured to determine a height of each of a plurality of pixels in the area occupied by the object relative to the reference plane based on the height map;

a grouping sub-component configured to group the pixels based on their heights relative to the reference plane and calculating a number of pixels in each group; and a second determining sub-component configured to perform operations comprising:

determining whether a ratio of the number of pixels in a group with a largest number of pixels to all the pixels in the area occupied by the object exceeds a first threshold;

determining a height of the pixels in the group with the largest number of pixels relative to the reference plane as the reference height of the object, in response to the ratio of the number of pixels in the group with the largest number of pixels to all the pixels in the area occupied by the object exceeding the first threshold;

determining whether a ratio of the number of pixels in the group with a largest height of the pixels relative to the reference plane to all the pixels in the area occupied by the object exceeds a second threshold, in response to the ratio of the number of pixels in the group with the largest number of pixels to all the pixels in the area occupied by the object not exceeding the first threshold; and determining the largest height of the pixels relative to the reference plane as the reference height of the object, in response to the ratio of the number of pixels in the group with the largest height of the pixels relative to the reference plane to all the pixels in the area occupied by the object exceeding the second threshold.

10. An intelligent shelf comprising:

a shelf body comprising shelf laminate for placing objects; and a device for detecting the stacking state of the object according to claim 7, wherein the reference plane is the shelf laminate.

11. The intelligent shelf of claim 10, wherein the device for detecting the stacking state of the object is located above the shelf laminate.

12. The intelligent shelf of claim 10 further comprising a detecting component configured to detect a position and orientation of the image capturing component.

13. The intelligent shelf of claim 12, the detecting component comprising at least one of an accelerometer or a gyroscope.

14. An intelligent shelf system comprising:

a shelf comprising a shelf body and an image capture component, wherein the shelf body comprises shelf laminates for placing objects and the image capture component is configured to acquire an color image and a depth image that are aligned with each other above the shelf laminates; and a computing device communicatively connected to the image capture component, comprising:

an identifying module configured to identify an object and an area occupied by the object in the color image;

a converting module configured to convert the depth image into a height map relative to a reference plane;

a determining module configured to determine a reference height of the object based on the height map and the area occupied by the object;

an acquiring module configured to acquire an actual height of the object based on the object that was identified; and a judging module configured to calculate an absolute value of a difference between the reference height and the actual height, to judge that the object is in a stacking state in response to the absolute value of the difference being greater than an error threshold, and to judge that the object is not in the stacking state in response to the absolute value of the difference being less than or equal to the error threshold.

* * * * *